UNITED STATES PATENT OFFICE.

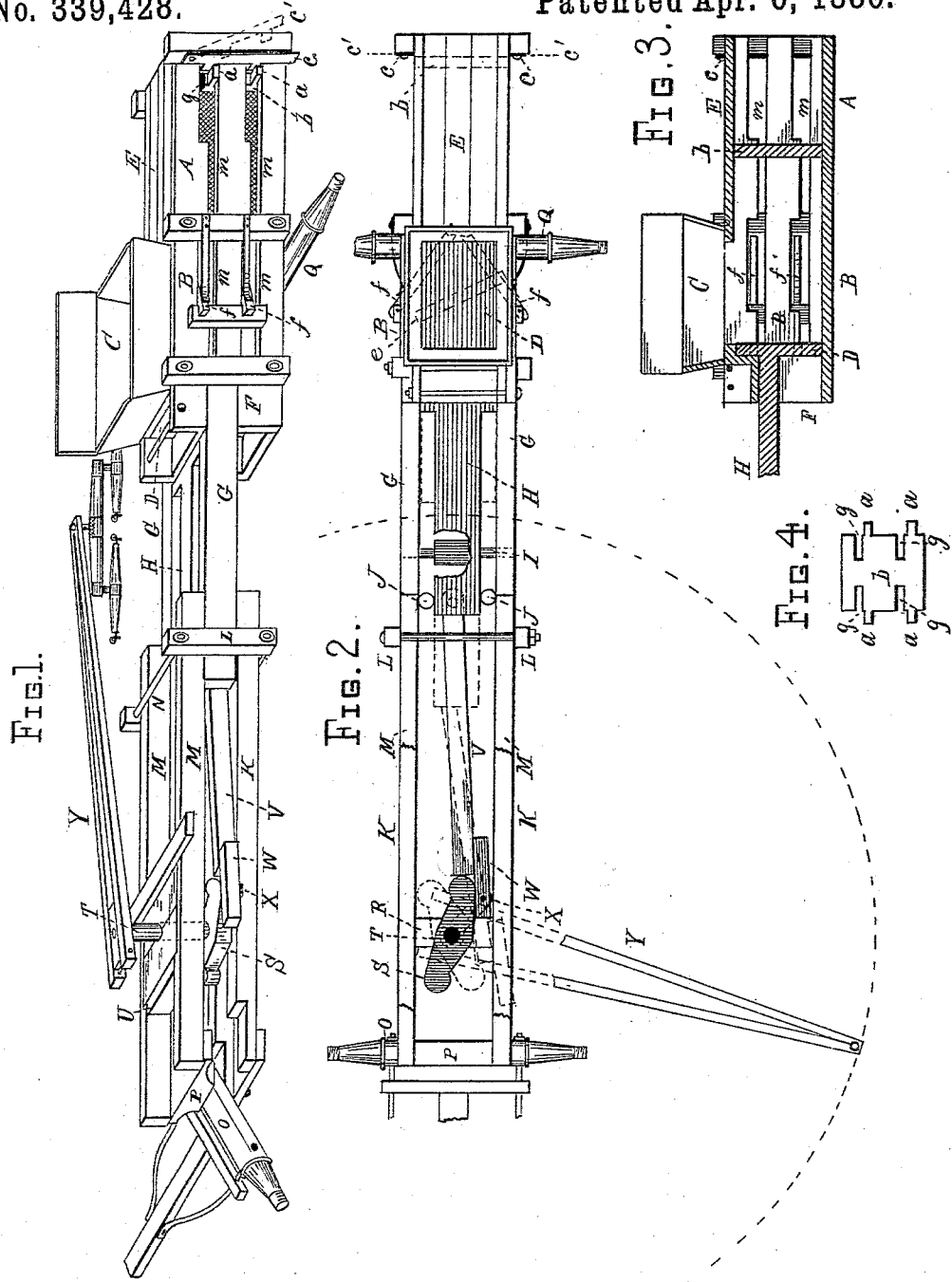

JAMES KEMP, OF KEMPTON, ILLINOIS.

HAY-PRESS.

SPECIFICATION forming part of Letters Patent No. 339,428, dated April 6, 1886.

Application filed November 28, 1885. Serial No. 184,221. (No model.)

*To all whom it may concern:*

Be it known that I, JAMES KEMP, a citizen of the United States, and a resident of Kempton, in the county of Ford and State of Illinois, have invented new and useful Improvements in Hay-Presses, of which the following is a specification, reference being had to the accompanying drawings, in which—

Figure 1 is a perspective view of a hay-press embodying my invention. Fig. 2 is a plan view of the same; Fig. 3, a horizontal section of the press box, piston, and hopper, the piston being in position as when the hopper is being supplied with hay; Fig. 4, an elevation of the follower removed from the press-box.

This invention relates to an improvement in power hay-presses which are designed to have a continuous feed, and so that the pressing of a bale will drive the bale previously pressed out of the press-box, and to press two or more feeds of hay at each circle traveled by the team. To attain this end, the feeding-space for the hay may be considered a combined structure with the press-box, a transverse section of each having the same area, except the feed-hopper, opens outward at its top, and is provided with a surrounding curb of truncated-pyramid form better to gather the hay to be acted upon by the piston. A follower is made to have a sliding movement in the press-box, and serves as a head to hold the hay being pressed, and after the bale has been pressed and tied the follower is removed from the press-box by disengaging its locking-plates, and is placed in the hopper in front of the press-bale, and there serves the purpose as a follower to drive the bale out of the press-box and as a head to press the incoming charges of hay against during the driving out of said bale. In connection with the hopper, and on a line with the press-box and the middle portion thereof, are affixed two sets of ordinary spring-struts, whose free ends swing inward at the receding movement of the piston, and hold the pressed hay from expanding so much as to prevent the introduction of new charges of hay into the hopper. The charges of hay in the hopper being driven into the press-box by the piston, throw the struts to one side for the passage of hay. The aforesaid follower is provided with so many horizontal slots at each of its vertical edges as there are spring-struts at each side of the hopper, that it may be placed in the hopper and be forced by the next charge of hay past the struts and against the inner end of the outgoing bale. The piston is operated by means of a cam, which is driven by means of a lever and suitable power. In this case a double cam is used, so that at each revolution of the sweep two charges of hay will be pressed, the elasticity of the hay giving a receding movement to the piston to enable a new charge of hay to be fed in the hopper.

A represents the press-box; B, the lower portion of the feed-hopper, which are substantially a combined construction and uniform in internal cross-section, and their ends are open, the hopper being elevated at C and enlarged for feeding hay, and the press-box covered at E. The piston D is made to move the entire length of the hopper B, and has an outer support or guide, F, adjoining the hopper, and its rod H is supported by an anti-friction roller, I, and is prevented from having a lateral movement by means of rollers J or other suitable guides. Strong timbers G G connect the hopper with the double frame M K by means of clamps or other suitable supports, L N. The outer ends of timbers M K connect with a bolster, P, and axle O of the forward truck for moving the press, Q being the rear axle.

S represents a double cam, which, by means of a vertical shaft, T, is pivoted to cross-bearers R U, respectively on the frame-pieces K M.

V represents a pitman, which is pivoted to the rod H, and is provided at its outer end with a notch formed by a block, W, rigidly secured to it, so that the ends of the cam S will engage said notch and drive the piston through the hopper to press the hay. Always to keep the notch at the end of pitman V in position to be engaged by the ends of the cam S, a strap, X, Figs. 1 and 2, is pivoted to the shaft T and block W, said strap being of such length as to allow the cam to rotate and come in contact with the pitman V twice at every revolution of the sweep Y.

Horizontally through both sides of the box A and hopper B are formed longitudinal openings *m m m m*, through which outwardly project tenons *a* on the follower *b*. This follower is to move from the hopper to the tail end of the press, as shown at Figs. 1 and 2, and the tenons $a$, by bearing against pivoted plates $c$, Fig. 1, hold the follower in position to hold the bale until it is sufficiently pressed. After this the pivoted plates $c$ are swung outward, as shown by dotted lines $c'$, to permit the follower to be removed at the rear end of the press-box. The piston D being withdrawn from the hopper B, the follower is placed diagonally in the hopper, as shown by dotted lines $e$, and then turned transversely to the said hopper to bring the tenons $a$ into the longitudinal openings $m$, in which they move back to their position shown at Fig. 1, during the time the follower is forcing out a pressed bale by means of the incoming pressed hay against it.

$f f$ represent two sets of spring-struts, which are pivoted to the sides of the hopper B, and swing through openings in the side of said hopper, and are employed to act against each charge of hay and keep it sufficeintly in the mouth of the press-box to permit a new charge to be put in the hopper. Notwithstanding, however, the pressure of these struts on the pressed hay, there is sufficient elasticity in the latter to throw the piston back to clear the lower portion, B, of the hopper. The slots $g g g g$ in the follower coinciding in height with the height of the struts, permits the follower to pass them by moving them partially to the sides of the hopper, and butt against the rear end of the bale that has been pressed. The end of the piston D is also provided with suitable slots horizontally formed to coincide with the positions of the said struts $f$, to permit the piston to move to the press-box without forcing the struts too far apart.

The power applied is horses attached to the sweep Y, they traveling over the center frame G of the machine similarly as horses travel over the trundling-rods of thrashing-machines.

I claim as new and desire to secure by Letters Patent—

1. The follower $b$, which is provided with tenons $a$ $a$, fitted to slide in the longitudinal openings $m$ $m$, in combination with the pivoted stop-plates $c$, press-box A, hopper B, and piston D, as and for the purpose specified.

2. The cam S, in combination with the pivoted connecting-plate X, the pitman V, having a notch formed on its end for engaging the cam by means of the side piece or block, W, the piston-rod H, piston D, hopper B, and press-box A, as specified, and for the purpose set forth.

JAMES KEMP.

Witnesses:
WILLIAM GOODMAN,
FRANK. CARY.